(12) United States Patent
Speight

(10) Patent No.: US 10,491,562 B2
(45) Date of Patent: Nov. 26, 2019

(54) ROUTER NODE, NETWORK AND METHOD TO ALLOW SERVICE DISCOVERY IN A NETWORK

(71) Applicant: Veea Systems Ltd., Bath (GB)

(72) Inventor: Timothy James Speight, Monmouthshire (GB)

(73) Assignee: Veea Systems Ltd., Bath (GB)

( * ) Notice: Subject to any disclaimer, the term of this patent is extended or adjusted under 35 U.S.C. 154(b) by 1 day.

(21) Appl. No.: 15/830,427

(22) Filed: Dec. 4, 2017

(65) Prior Publication Data

US 2018/0159818 A1 Jun. 7, 2018

(30) Foreign Application Priority Data

Dec. 7, 2016 (GB) .................................. 1620798.7

(51) Int. Cl.
| | | |
|---|---|---|
| *H04L 29/12* | (2006.01) | |
| *H04L 29/06* | (2006.01) | |
| *H04L 29/08* | (2006.01) | |
| *H04W 48/10* | (2009.01) | |
| *H04W 84/18* | (2009.01) | |

(52) U.S. Cl.
CPC ...... *H04L 61/1541* (2013.01); *H04L 61/1511* (2013.01); *H04L 67/125* (2013.01); *H04L 67/2842* (2013.01); *H04L 69/08* (2013.01); *H04W 48/10* (2013.01); *H04L 61/6009* (2013.01); *H04L 67/12* (2013.01); *H04W 84/18* (2013.01)

(58) Field of Classification Search
CPC ............... H04L 67/125; H04L 61/1541; H04L 67/2842; H04L 69/08; H04L 61/1511; H04L 61/6009; H04L 67/12; H04W 48/10; H04W 48/18
See application file for complete search history.

(56) References Cited

U.S. PATENT DOCUMENTS

| | | | | |
|---|---|---|---|---|
| 2005/0044355 A1* | 2/2005 | Cheshire | ............. | H04L 67/2852 713/163 |
| 2008/0091776 A1* | 4/2008 | Miyamoto | .......... | H04L 12/2809 709/203 |
| 2008/0112419 A1* | 5/2008 | Lee | ..................... | H04L 12/2805 370/401 |
| 2012/0254655 A1* | 10/2012 | Butterworth | ........ | G06F 11/1658 714/4.11 |
| 2014/0006582 A1* | 1/2014 | Akolkar | ............... | G06Q 10/103 709/223 |

(Continued)

OTHER PUBLICATIONS

European Search Report; European Patent Application No. 17205104. 7-1423; dated Apr. 23, 2018.

(Continued)

*Primary Examiner* — Brian D Nguyen
(74) *Attorney, Agent, or Firm* — Fitch, Even, Tabin & Flannery LLP

(57) ABSTRACT

A router node for a network is described. The router node comprises: a transceiver; an interface operably coupled to the transceiver; and a signal processor operably coupled to the transceiver and configured to support a consensus protocol. The signal processor is operably coupled to a cache and configured to receive and distribute resource records to other nodes in the network via the interface and store the resource records in the cache.

17 Claims, 7 Drawing Sheets

(56) References Cited

U.S. PATENT DOCUMENTS

| | | |
|---|---|---|
| 2014/0173134 A1 | 6/2014 | Choquette |
| 2014/0304385 A1* | 10/2014 | Lee .................... H04L 12/2805 |
| | | 709/223 |
| 2015/0207695 A1* | 7/2015 | Varney ................ H04L 41/0893 |
| | | 709/223 |
| 2015/0347309 A1 | 12/2015 | McIntyre |
| 2016/0277878 A1* | 9/2016 | Lee ........................ H04W 4/80 |
| 2017/0177448 A1* | 6/2017 | Muth .................... G06F 16/128 |

OTHER PUBLICATIONS

British Application No. GB1620798.7; Combined Search and Examination Report Under Sections 17 and 18(3); dated May 19, 2017, 8 Pages.
Homenet Working Group, Internet Draft, Home Networking Control Protocol, draft-ietf-homenet-hncp-bis-00, Jul. 8, 2016, Stenberg M., et al. Obtained from: https :/ /too ls.ietf.org/pdf/ draft-ietf-homenet-hncp-bis- 00.pdf.
Internet Engineering Task Force (IETF), Request for Comments (RFC) 7787, Apr. 2016, "Distributed Node Consensus Protocol", Stenberg, M. et al. Obtained from: https://tools.ietf.org/pdf/rfc7787.pdf.
IEEE Wireless Communications and Networking Conference, 2008, Apr. 15, 2008, "Service discovery in wireless mesh networks", Krebs, M. et al.INSPEC Accession No. 9925727.

\* cited by examiner

ROUTER NODE, NETWORK AND METHOD TO ALLOW SERVICE DISCOVERY IN A NETWORK

RELATED APPLICATION(S)

This application claims the benefit of United Kingdom Application No. GB1620798.7 filed Dec. 7, 2016. The content of this application is fully incorporated herein in its entirety.

TECHNICAL FIELD

The field of this invention relates generally to a router node, small networks, such as home or mesh networks, and a method to allow service discovery in these networks. In particular, some example embodiments of the invention provide for a router node that is configured to use a consensus protocol to be able to cache mDNS-SD resource records.

BACKGROUND

Service discovery is the mechanism by which hosts can automatically detect devices and services offered by these devices in a network. The issue is important both for conventional human orientated service and Internet of Things (IoT) applications. The problem is illustrated by the following examples. In a first example, a home user purchases a network printer for their home network. They wish to turn the device on, connect it to their network and start printing without specific network management expertise. They do not wish to force it to use a static IP address and manually configure this into their computer/tablet. In a second example, let us assume that thousands of IoT sensor devices are connected to a network and each is dynamically assigned an IP address. A processing function wishes to locate the devices so that it can process the data that they provide without having to manually configure large numbers of IP addresses.

A number of service discovery protocols have been proposed. However, DNS based service discovery is the most widely used presently and is able to provide functionality across the range of use cases from the home user example to the IoT case. Multicast Domain Name System DNS (mDNS) together with DNS based service discovery (DNS-SD) provide a simple means by which service discovery can be implemented with little dedicated equipment or experienced personnel to manage the functionality. A DNS is a hierarchical decentralized naming system for computers, services, or any resource connected to the Internet or a private network. It associates various items of information with domain names assigned to each of the participating entities.

Typically a conventional DNS server requires manual configuration of the zone files. This would be possible in say a large enterprise network where an IT professional would configure, for example, DNS records for the office printer to allow printing of files from anywhere in the office even if clients are not in the same LAN segment.

In the home environment this is not the case. A home user cannot be expected to populate DNS records or to manage naming of devices. To this end mDNS was developed. This enables DNS functionality to operate in the local link without a centralized DNS server (i.e. within a single LAN segment) using multicast transmissions.

Defined in RFC 6762. mDNS functionality can be briefly described as: providing the ability to perform DNS-like operations in the absence of any conventional unicast server. Thus the primary purpose of mDNS is to enhance name resolution in the local area network.

Due to the fact that mDNS operates only in the local link naming is not in the same form of as used in conventional DNS, where typical hierarchical domain name structures apply, such as 'printer02.men67.virtuosys.com.'. Instead a new top level domain is defined, '.local.'. This new namespace results in host names such as 'printer02.local'.

DNS-SD is a standardized protocol for describing and resolving services using DNS resource records. DNS-SD defines how a client can leverage standard DNS queries to discover service instances using PTR, SRV, TXT and A/AAAA records. The key innovation in DNS-SD is the use of indirection in PTR record querying which allows a host to browse for a list of available services. Thus, rather than finding a specific service a host can query for printers and get a response, indicating Lab printer, Office printer, meeting room printer etc. from which the host can choose the appropriate response. DNS-SD defines a structured service instance naming scheme to allow this to be accomplished.

The IETF homenet group (https://tools.ietf.org/wg/homenet/) has been working on the problem of complex modern home networks which involve multiple links with potential multiple external connections (e.g. ISP for general internet and another ISP for multimedia applications). With current technology, in these scenarios the home user is required to perform network management in order to ensure performance in the network. For example with multiple layer-2 links, mDNS functionality will not work across the whole home network. Also there may be IP address clashes etc. The home network group has produced RFCs in order to define auto configuration functionality of home networks so that networks configure themselves optimally without complex network management having to be performed. The RFCs that define the homenet functionality include the following.

RFC 7368 ('IPv6 Home Networking Architecture Principles (HNAP)'), which provides the architecture and design requirements for homenet.

RFC 7787 ('Distributed Node Consensus Protocol (DNCP)'). DNCP provides a framework for the mechanism by which peer nodes exchange state information about themselves in an efficient manner (as it is a consensus protocol that is optimized so that it requires the minimum of signalling when there is no change to the information). It allows a number of profiles to be used on top of the framework provide by DNCP.

RFC 7788 ('Home Network Control Protocol (HNCP)'). HNCP is an extensible configuration protocol and a set of requirements for home network devices. HNCP is described as a profile of, and extension to, the Distributed Node Consensus Protocol (DNCP). HNCP enables discovery of network borders, automated configuration of addresses, name resolution, and the use of any routing protocol which supports routing based on both source and destination address. HNCP is a profile which sits on top of DNCP. It defines parameters which are important in controlling HNCP nodes within a home network, such as prefixes and IP addresses, service discovery, which nodes should perform DHCP for a particular link, etc.

RFC 7695 ('Distributed Prefix Assignment Algorithm (DPAA)'). This RFC defines an algorithm for choosing a prefix to be used on a link from a pool of available prefixes so as to avoid a clash. Additionally a trickle algorithm (RFC 6206) defines a way in which low volumes of data are transferred efficiently during quiescent periods in the network.

The main purpose of HNCP/DNCP algorithms is to allow nodes to know the state of information in all of the other peer HNCP/DNCP nodes in the network.

HNCP defines a number of Type-Length-Value (TLV), which describes parameters such as the prefixes that a node has assigned to its interfaces, the IP address which the node is using itself, information about the external connection of network (only associated with nodes which are border routers, which may be referred to as a mesh edge node (MEN). Within data communication protocols, optional information may be encoded as a TLV element (sometimes referred to as a tag-length-value) inside a protocol. The type and length are fixed in size (typically 1-4 bytes), and the value field is of variable size. These fields are used as follows: Type: A binary code, often simply alphanumeric, which indicates the kind of field that this part of the message represents; Length: the size of the value field (typically in bytes); and Value: Variable-sized series of bytes which contains data for this part of the message.

The aim of the algorithm is to ensure that each node knows the current TLVs of all the other HNCP nodes in the network. However simply sending these TLV periodically is inefficient. Thus each node calculates a hash of its own set of TLVs and each of the TLVs for other peer nodes, these are called node hashes. Note also that node IDs are assigned to each node to identify individual node appropriately. It then uses this set of node hashes to create a network hash. This hierarchical hash functionality is illustrated in FIG. 1.

Referring now to FIG. 1, an overview of a known architecture 100 of a hash tree is illustrated. Each node 130, 132, 134, 136 creates a hash based on the information it wishes to publish in the network. Each node 130, 132, 134, 136 operates a consensus protocol, such as HNCP/DNCP, to ensure that all the nodes know all of the information, such as their internet protocol (IP) address, an assigned prefix and an indication of the node capabilities, etc. about their peers. In FIG. 1, node 3 134 is identified as a border router in the network (which may be referred to as a mesh edge node) as it has a backhaul connection to the Internet and may be further identified by border router information, such as a delegated prefix 135. The information from each of the HNCP/DNCP nodes 130, 132, 134, 136 is transferred 122 to a node hash function 120 that hashes node-specific data, prior to transferring 112 all node hash information within a network to a network hash function 110. HNCP/DNCP nodes 130, 132, 134, 136 are arranged to multicast a network hash 110 (to the all-homenet-node multicast address, ff02::11). Whilst each of the HNCP/DNCP nodes 130, 132, 134, 136 transmit the same network hash 110 a trickle algorithm ensures that there is minimal activity in the network (the rate of transmission is slowly reduced over time until a minimum level is reached).

When one of the HNCP/DNCP nodes 130, 132, 134, 136 has a change of information in its TLVs, then it will re-calculate its node hash 120 resulting in an update of its network hash 110. This new network hash 110 will then be multicasted to all other nodes. When a neighbouring node receives this new network hash 110, it will detect that this is different to its own network hash 110 and it will use unicast signalling to request the node to send its node hashes 120. The neighbouring node will then inspect the node hashes 120 and then request the full node data for the node ID, which has a different hash than the one that it has stored. Note that sequence numbers are used so that the newest hash is detected. The node then sends the full node data (using unicast) for the requested node to the neighbor node.

This new data can then ripple through the network so that all nodes 130, 132, 134, 136 know the new TLV data and, thus, all nodes 130, 132, 134, 136 have the same network hash 110, which they all multicast, i.e. a new steady state is reached in the network where everybody has the up to date information.

Once nodes have up to date information about their peer group that they can then make sensible decisions themselves about their own configuration. For example, when they know the prefixes that other nodes are currently using, they themselves can then avoid assigning these prefixes to their own interfaces.

A known problem with such mDNS/DNS-SD functionality is how to operate efficiently in a small multi subnet network. A wireless mesh network 200 is used in FIG. 2 to illustrate this problem, where each node acts as a router and allows external devices to connect to the network using wireless connectivity. Although the problem is explained with respect to a network using wireless connectivity, it could equally well apply to a home network case where router devices are used that are connected by wired technology, such as powerline or Ethernet again allowing an external device to connect by, say, WiFi™ or other means. In these constrained network scenarios mDNS is appropriate, because of its simplicity. However, mDNS cannot be used as it is designed to only work in the local link, i.e. across a single subnet.

The wireless mesh network 200 includes a backhaul connection 212 connecting a border router (mesh edge node (MEN)) 220 in the network to, say, the Internet 210. The MEN 220 is connected 231 to a messaging server 230. The wireless mesh network 200 includes a number of internal routers (sometimes referred to as mesh nodes (MNs)) that provide routing functionality in the wireless mesh network 200, but do not have a backhaul connection. The MN devices in the wireless mesh network 200 have WiFi™ (or other wireless technology) functionality, separate to the mesh interconnects, which allows external devices to connect to the wireless mesh network 200. For example, a first MN#1 222 of a first network area 242 includes a first smartphone#1 252 and a network-enabled speaker 253 and is coupled 235 to the MEN 220. A second MN#2 228 of a second network area 248 includes a network-enabled printer 258 and is also coupled 236 to the MEN 220. The second MN#2 228 is also coupled 233 to an Internet of Things temperature sensor processing server 232, arranged to process temperature sensor data. A third MN#3 224 of a third network area 244 includes a Internet of Things temperature sensor 254 and is coupled 237 to the second MN#2 228. A fourth MN#4 226 of a fourth network area 246 includes a second smartphone#2 256 and is also coupled 238 to the second MN#2 228.

Each of the internal routers/internal edge routers (MN/MEN) 220, 222, 224, 226, 228 includes, say an 802.11 access point (AP) or 802.15.4 or IPv6 enabled Bluetooth™, etc., which allows external host devices to connect to the device.

In operation, first smartphone#1 252 wishes to use the network-enabled speaker 253. The network-enabled speaker 253 is connected to the same access point (AP), namely first MN#1 222, as the first smartphone#1 252. Thus, they both use the same local link. Thus, conventional mDNS/DNS-SD can be used by the first smartphone #1 252 to discover this network-enabled speaker 253; as mDNS only works in the local link and no modification is required to the router nodes or any of the client devices.

However, if second smartphone#2 256 wishes to use the network-enabled printer 258, it is unable to use conventional mDNS/DNS-SD. This is because these two clients are connected to different APs, i.e. in fourth MN#4 226 of fourth network area 246 and in second MN#2 228 of second network area 248. Hence, they are in different local links and, thus, multicast DNS queries sent from the second smartphone#2 256 will not be routed to the second MN#2 228 and then on to the network-enabled printer 258.

A mechanism is required to allow mDNS-equipped hosts to communicate between each other in the mesh, i.e. a mechanism is needed to find the IP address of the network-enabled printer 258 located in another AP.

A similar problem occurs with the IoT temperature sensor 254, which needs to find a server on which its measurements can be processed. The measurement processing server resides in or is coupled to) second MN#2 228, which is not in the same local link as the IoT temperature sensor 254. A solution using simple mDNS at the IoT temperature sensor 254 is again needed.

A further similar problem occurs when first smartphone#1 252 and second smartphone#2 256 wish to talk to each other via a messaging server that is located on the MEN 220. Again the problem is for the first smartphone#1 252 and second smartphone#2 256 to find the IP address of the service (via the message server) that they want, although it is not in the same local link. However, this time the service does not reside on an external device but is located on (or coupled to) a router node, namely MEN 220.

Thus, it would be useful to enable all devices to communicate to all other devices within the network and external to the network, and each of the devices to perform the same functionality as some of the other devices, a mechanism to manage this complex cross-functional operation is required. It would also be useful to see all of these services across the whole of the mesh (or home network or any other constrained multi-hop network). These services cannot be seen using this conventional technology, except if the service is located in the local link supported, e.g., connected to the same AP.

One Known solution to this problem is to use a hybrid unicast/multicast DNS-based service discovery (for example as described in https://tools.ietf.org/html/draft-ietf-dnssd-hybrid-03). The hybrid unicast/multicast DNS-based service discovery relies on hybrid functionality residing on the HNCP nodes (router nodes in a small wireless mesh network), in order to discover multicast DNS records on its local link, and make corresponding DNS records visible in the unicast DNS namespace. This functionality is illustrated in the mesh architecture 300 of FIG. 3, which describes a Hybrid unicast/multi-cast DNS, as proposed by Cheshire in an experimental RFC.

The mesh architecture 300 includes a backhaul connection 312 connecting a border router (mesh edge node (MEN)) 320 in the network to, say, the Internet 310. The mesh architecture 300 includes a number of internal routers (sometimes referred to as mesh nodes (MNs)) that provide routing functionality in the mesh architecture 300, but do not have a backhaul connection. For example, a first MN#1 322 is coupled 335 to the MEN 320 and arranged to cover a first network area 342 (subnet) that includes a first smartphone#1 352. A second MN#2 324 is coupled 336 to the MEN 320 and arranged to cover a second network area 344 (subnet) that includes a network-enabled printer 354.

In the hybrid unicast/multicast DNS-based service discovery of FIG. 3, a (client) first smartphone#1 352 sends a unicast DNS query 362 for printers in a specific domain. This is sent to its local DNS server (which is in fact a hybrid proxy) on first MN#1 322. Conventional recursive DNS functionality is used so that the query is forwarded 372 until it reaches the delegated authoritative name server for the appropriate domain, namely the hybrid proxy at second MN#2 324.

The hybrid proxy at second MN#2 324 can consult its mDNS cache (not shown) to see if it has a record that is appropriate to answer the query (just as a conventional DNS server would consult the resource records (RRs) that it is authoritative for). However, in this case, there is no appropriate cached information. Therefore, it issues a mDNS query where it translates the query from_printer._tcp.mn2.men8912.vmesh.com. 365 to_printer._tcp.local 364. This mDNS message is then multicasted in the subnet associated with second MN#2 324.

The printer then responds to this PTR query by responding with is name 'lab printer'. This PTR response is sent again using multicast DNS. The hybrid proxy at second MN#2 324 then converts this back to unicast DNS (appending it's delegated domain) and this is sent back to the smartphone, via the DNS function at first MN#1 322.

As discussed above one obvious question which arises is how does the client smartphone device know that it should query the 'mn2.men8912.vmesh.com.' domain? The answer is domain enumeration. This is a feature of DNS-SD as described in section 11 of DNS-SD specification at RFC6763, which provides clients with recommendations on which domains to browse for service. The client sends a PTR query for defined record names, these include the following: The browse domain, which uses the PTR b._dns-sd._udp. This is a list of domains which to browse for services, i.e. RRs in the DNS server with this string would contain a list of domains.

The default domain, which uses the PTR db._dns-sd._udp. This is a single default domain on which to browse for services.

The legacy browse domain—lb._dns-sd._udp. The hybrid proxy will respond to queries sent to PTR with the above strings for both the unicast and multicast case. In this known example these records at the DNS (for the multicast case) might look like:

b._dns-sd._udp. PTR mn1. men8912.vmesh.com.
mn2. men8912.vmesh.com.
db._dns-sd._udp. PTR mn1. men8912.vmesh.com.
lb._dns-sd._udp. PTR mn1. men8912.vmesh.com.

Note that clients typically learn the location of their home DNS server address and home DNS home domain name by means of DHCP options, see RFC 2132 (code 6=DNS address, code 15=DNS domain name).

The inventors have identified that there are three main problems with hybrid proxy mechanism of FIG. 3, when used in a small wireless mesh network.

First, there is a need to assign domain names to links. In home networks and small wireless mesh networks it shouldn't really be necessary to do this; nodes in these networks can be added dynamically due to new devices appearing or changes in the radio environment, in the case of wireless mesh networks, to have to dynamically add domain names and to manage them autonomously is problematic when there is no real benefit to be obtained.

Secondly, the clients must have some picture of the mesh. When domain enumeration is carried out the client is presented with a list of domains on which to browse, which should be chosen is not obvious.

Thirdly, the architecture of home networks and small wireless mesh networks is such that there really isn't any need to have separate domains within any of the links in the mesh. The proposal means that the functionality is unnecessarily complex.

A solution is therefore required for allowing service discovery using mDNS to operate in small multi subnet networks, such as wireless mesh networks.

SUMMARY OF THE INVENTION

In a first aspect of the invention, a router node for a network (such as a small network) is described. The router node comprises: a transceiver; an interface operably coupled to the transceiver; and a signal processor operably coupled to the transceiver and configured to support a consensus protocol. The signal processor is operably coupled to a cache and configured to receive and distribute resource records to other nodes in the mesh network via the interface and store the resource records in the cache.

In this manner, a use of a consensus protocol by a router node allows the router node to distribute resource records to other nodes in the mesh network via the interface and store the resource records in the cache in order to support service discovery in small multi subnet networks, such as wireless mesh networks.

In an optional example of the invention, the resource records stored in the cache may include router node multi-cast Domain Name System, mDNS, information. In an optional example of the invention, the signal processor may be configured to support a use of DNS service discovery, DNS-SD, to determine an internet protocol, IP, address of devices and other router nodes located in the network. In some examples, the resource records may include a Type-Length-Value, TLV, describing mDNS, cache information of other nodes in the mesh network.

In an optional example of the invention, the consensus protocol may be a Distributed Node Consensus Protocol, DNCP, and in some examples a Home Network Control Protocol, HNCP profile may be used as an extension to the DNCP.

In an optional example of the invention, the signal processor and transceiver may be configured to publish a resource record whenever the cache is updated. In some examples, the cache may be updated following a receipt of an Announcement message of a new service within the network In an optional example of the invention, the transceiver may receive an mDNS query and the signal processor may determine whether the mDNS queried service is contained in the cache, and if the queried service is contained in the cache, the signal processor sends a response to the query. In some examples, the signal processor may be further configured to determine whether the DNS records for the queried service have been learned from the consensus protocol, and the signal processor sends a response to the query when the queried service is contained in the cache and the queried service has been learned from the consensus protocol.

In an optional example of the invention, the signal processor may be configured to share the router node's mDNS cache information using the consensus protocol with at least one other router node in the network in a small network of one from a group of: a mesh network, a home network.

In a second example of the invention, a method to allow service discovery in a network (such as a small network) that comprises a router node coupled to a cache is described. The method includes, at the router node: supporting a consensus protocol; receiving a resource record identifying one or more other nodes or devices contained in or coupled to the network; storing the received resource record in the cache; and distributing resource records from the cache to other nodes and devices within the network.

In a third example of the invention, a network (such as a small network) is described. The network includes a cache; at least one router node coupled to the cache and comprising, a transceiver; an interface operably coupled to the transceiver; and a signal processor operably coupled to the transceiver and configured to support a consensus protocol. The signal processor is configured to receive and distribute resource records to other nodes in the network via the interface and store the resource records in the cache.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

Figure 1:
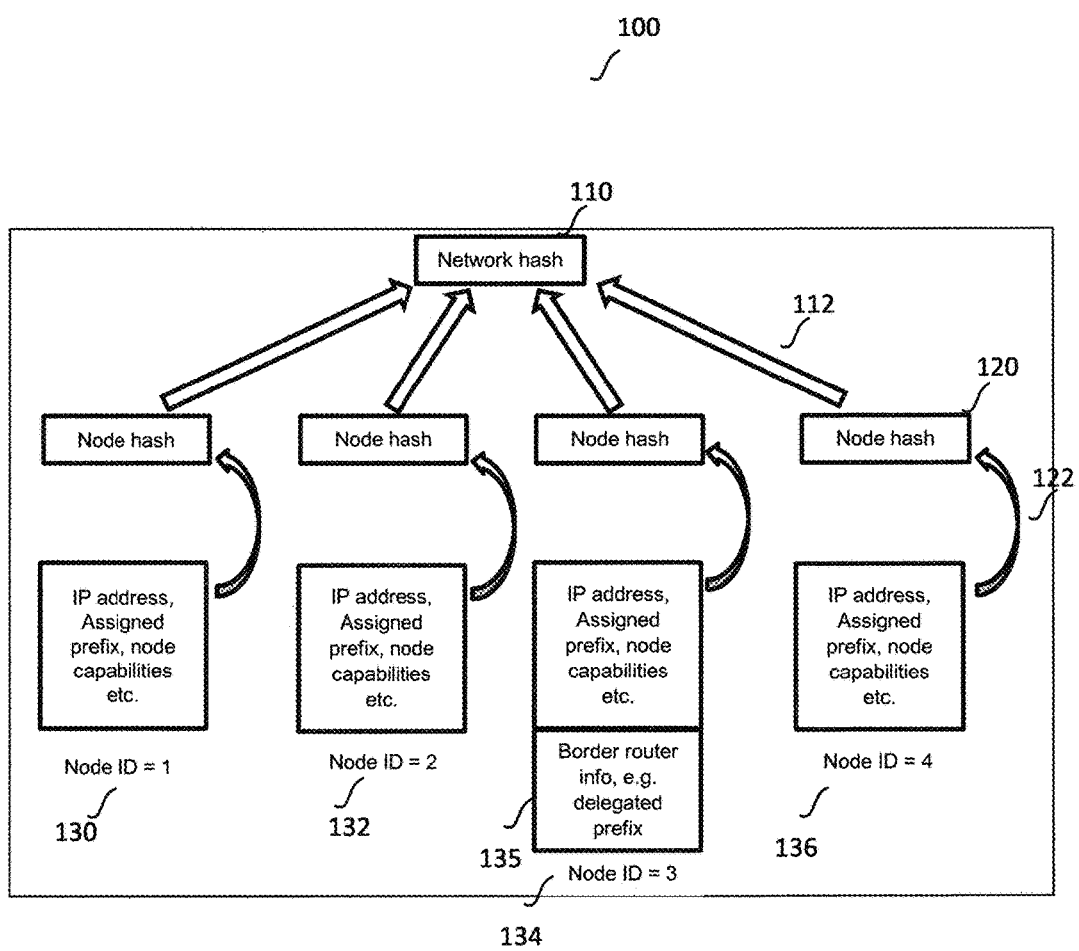
FIG. 1 illustrates an overview of a known architecture of a hash tree used in HNCP/DNCP.
Figure 2:
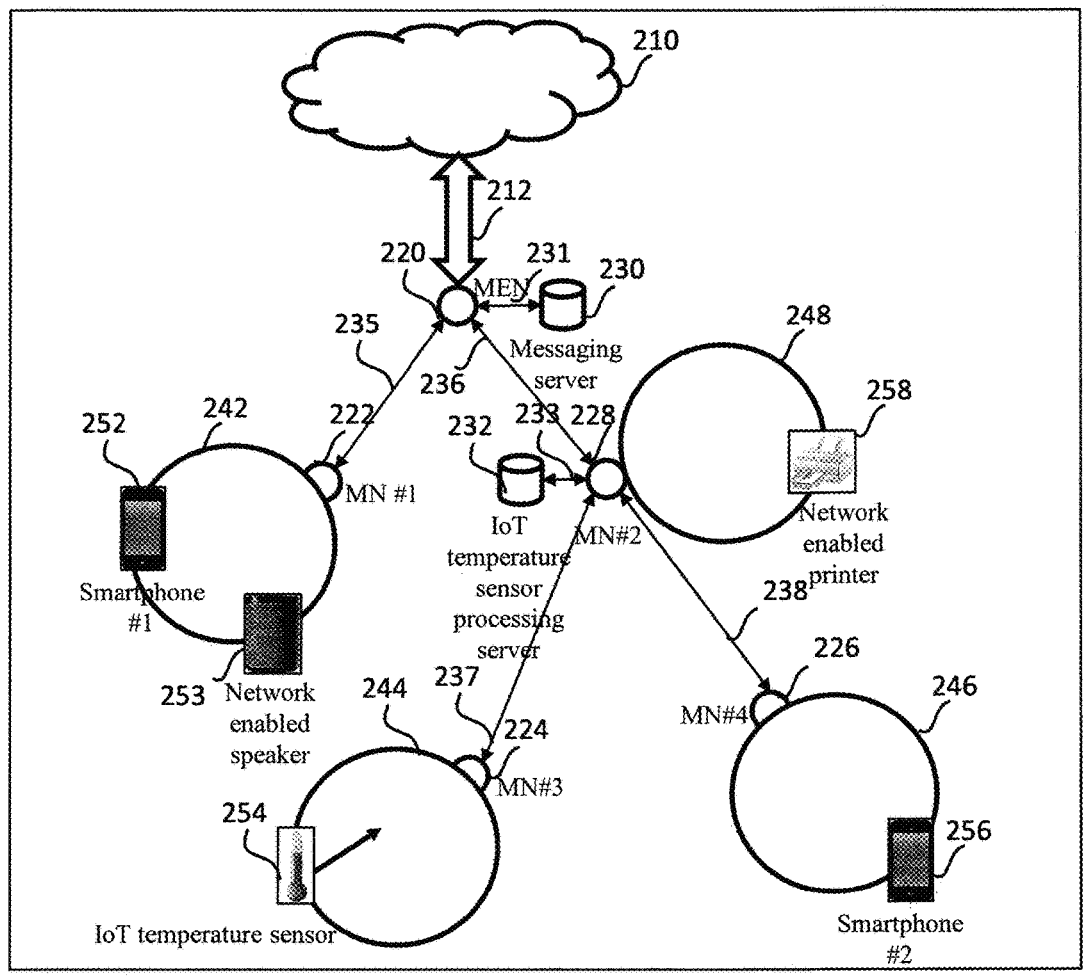
FIG. 2 illustrates a known example set of devices in a mesh.
Figure 3:
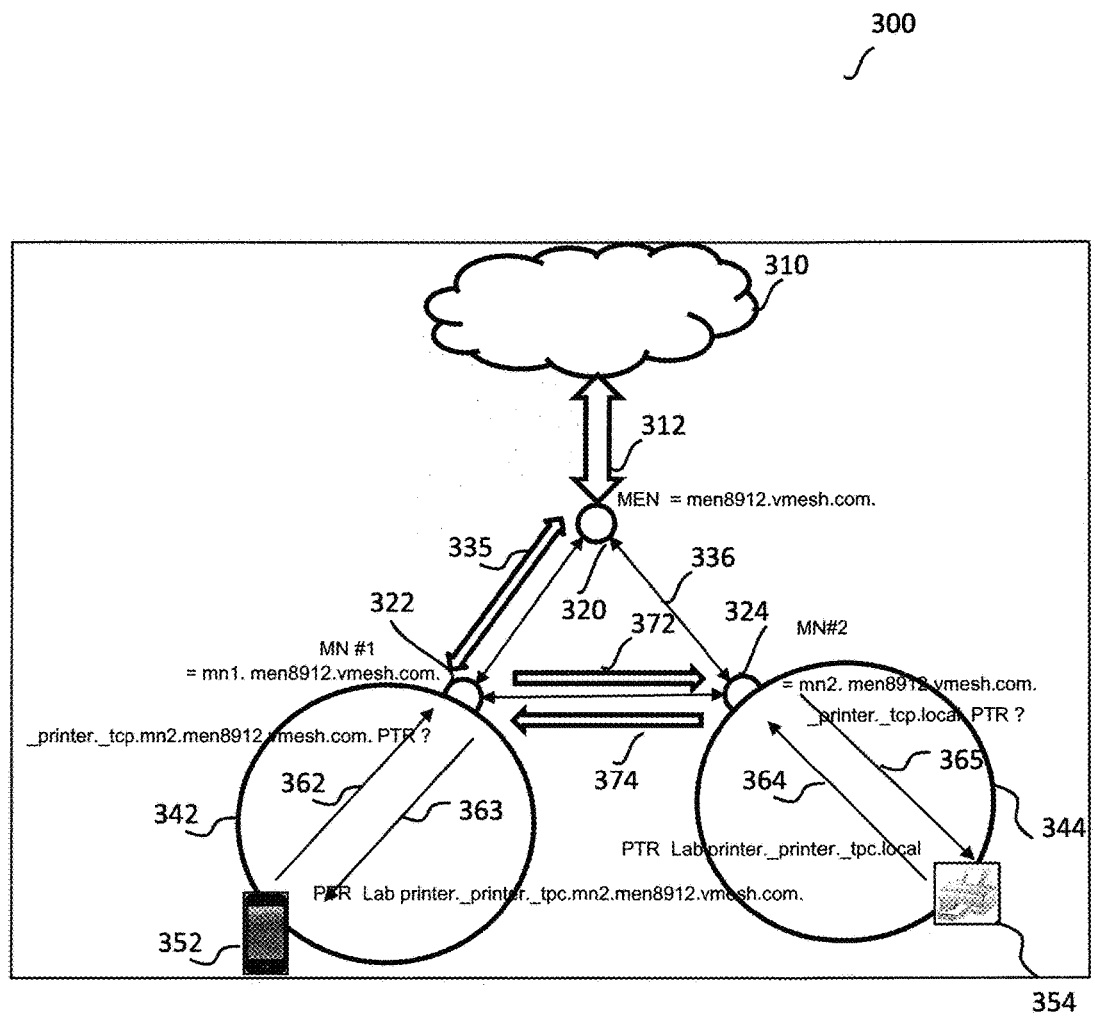
FIG. 3 illustrates a known example of a hybrid unicast/multi-cast DNS arrangement, as proposed by Cheshire in an experimental RFC.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Example embodiments of the present invention are described with respect to router nodes in small wireless mesh networks, which have been modified to support a service discovery feature. In examples embodiments, router nodes with the addition of consensus protocol are configured to distribute resource records around the network. Examples of the invention describe a mechanism for one or more router node(s) to distribute resource records, for example share their mDNS caches, using a consensus protocol, e.g. HNCP TLVs, with at least one other router node in the network. Thus, in this example, a TLV is used to describe mDNS cache information employed by router nodes within the wireless mesh networks. In some examples, the distribution of resource records may be used for services located on the router node or for services located on at least one external device(s). In some examples, the distribution of resource records may be sent to multiple (and in some instances all) other router nodes in a mesh network. Advantageously, the modified router nodes may use unmodified forms of mDNS. mDNS service discovery is used exclusively. Unicast DNS service discovery is not used to discover services in a different link (as is the case for the hybrid proxy solution).

In this manner, one or multiple router nodes may send mDNS announcements that are cached at other router nodes. Similarly, one or multiple router nodes may act as mDNS responders for queries that are associated with clients that are located outside of the local link (using the shared resource records (e.g. mDNS cache information) obtained from another router node).

Albeit that a key known feature of mDNS is that it only works in a local link, a use of a new HNCP TLV enables the router nodes within a small network, such as a wireless mesh network or home network, to resolve the problem of how to manage which device performs certain functions within the network. This selection of which device performs certain functions within the network is resolved by an intelligently sharing of device information amongst the router nodes within the mesh network, using, for example, a TLV to describe mDNS cache information employed by router nodes within the wireless mesh networks.

The overall functionality is such that from a service discovery perspective it appears as though all clients belong to the same link (despite the fact that L3 routing is employed in the mesh).

Figure 4:
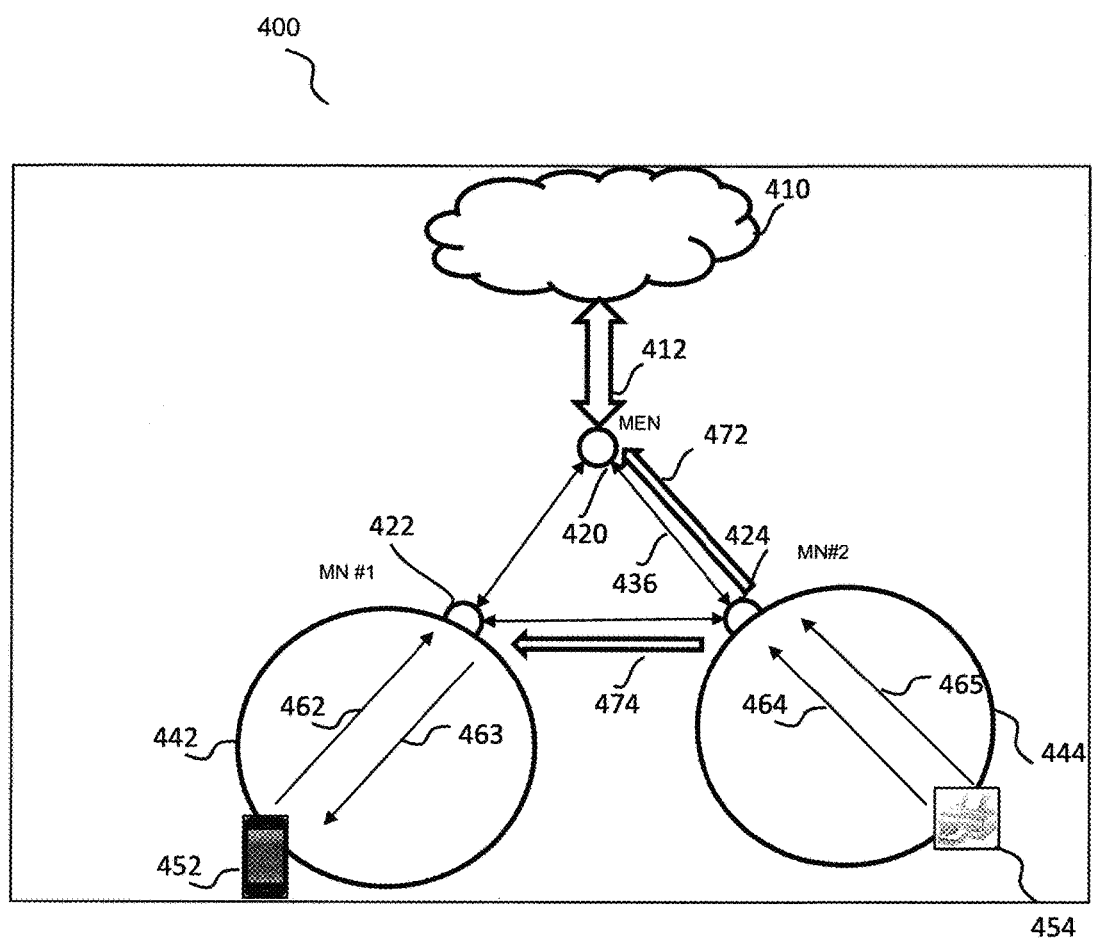
FIG. 4 illustrates a simple example of a proposed m-DNS service discovery in a small wireless mesh network in accordance with some example embodiments of the present invention.

Referring now to FIG. 4, an example of a small wireless mesh network 400 configured to support a consensus protocol, such as mDNS/DNS-SD functionality, is illustrated according to some example embodiments of the invention. In this example, client devices including a simple smartphone and network printer are located in the example small wireless mesh network 400. The small wireless mesh network 400 includes a backhaul connection 412 connecting a border router (sometimes referred to as an internal edge router or mesh edge node (MEN)) 420 in the network to, say, the Internet 410. The small wireless mesh network 400 includes a number of internal routers (sometimes referred to as mesh nodes (MNs)) that provide routing functionality in the small wireless mesh network 400, but do not have a backhaul connection. For example, a first MN#1 422 is coupled 435 to the MEN 420 and arranged to cover a first network area 442 that includes a first smartphone#1 452. A second MN#2 424 is coupled 436 to the MEN 420 and arranged to cover a second network area 444 that includes a network-enabled printer 454.

In this example of the small wireless mesh network 400 supporting a consensus protocol, such as mDNS/DNS-SD functionality, the network-enabled printer 454 uses a known probing message of mDNS queries to check that the chosen client name is unique. The second MN#2 424 consults its cache (not shown) to see if it had a stored entry for that client name. If it does have a stored entry, then the name that the network-enabled printer 454 had chosen would not be unique and second MN#2 424 would need to respond in order to defend this name. In this example of FIG. 4, no such record occurs in the cache. After a probing message has been sent, and no response is received, the network-enabled printer 454 knows that its chosen name is unique in accordance with standard behavior associated with mDNS. The network-enabled printer 454 then sends an announcement 464, which is a query response that contains all of the resource records that it wishes to use or publish, as defined in RFC 6762. The second MN#2 424 then stores all of these records in its mDNS cache (not shown).

In accordance with example embodiments, whenever a mDNS cache is updated, this information is published using a consensus protocol, such as HNCP/DNCP, using for example new TLVs that contain the mDNS cache information of the router node. This protocol enables information to be shared amongst all HNCP/DNCP nodes (the HNCP protocol is another profile that is used to allow a consistent and unique IP prefix allocation policy). In this way all nodes have full knowledge of the mDNS cache of all the other routers in the network. The signaling associated with the consensus protocol sharing of the mDNS cache information, is illustrated in communications 474 and 472. At a later time the first smartphone#1 452 sends a PTR query, which matches the PTR record for the network-enabled printer 454 (information contained the announcement of 464).

In accordance with example embodiments, the first MN#1 422 has obtained the mDNS cache contained in second MN#2 424 using consensus protocol signaling, such as HNCP/DNCP signaling, 474. It can therefore respond directly to the first smartphone#1 452, as if the network-enabled printer 454 was in the local link of first MN#1 422 (i.e. responding with mDNS).

In accordance with example embodiments, the first MN#1 422 sends query responses to the first smartphone#1 452 in order to answer the queries sent from the first smartphone#1 452 as part of the service discovery process.

Figure 5:
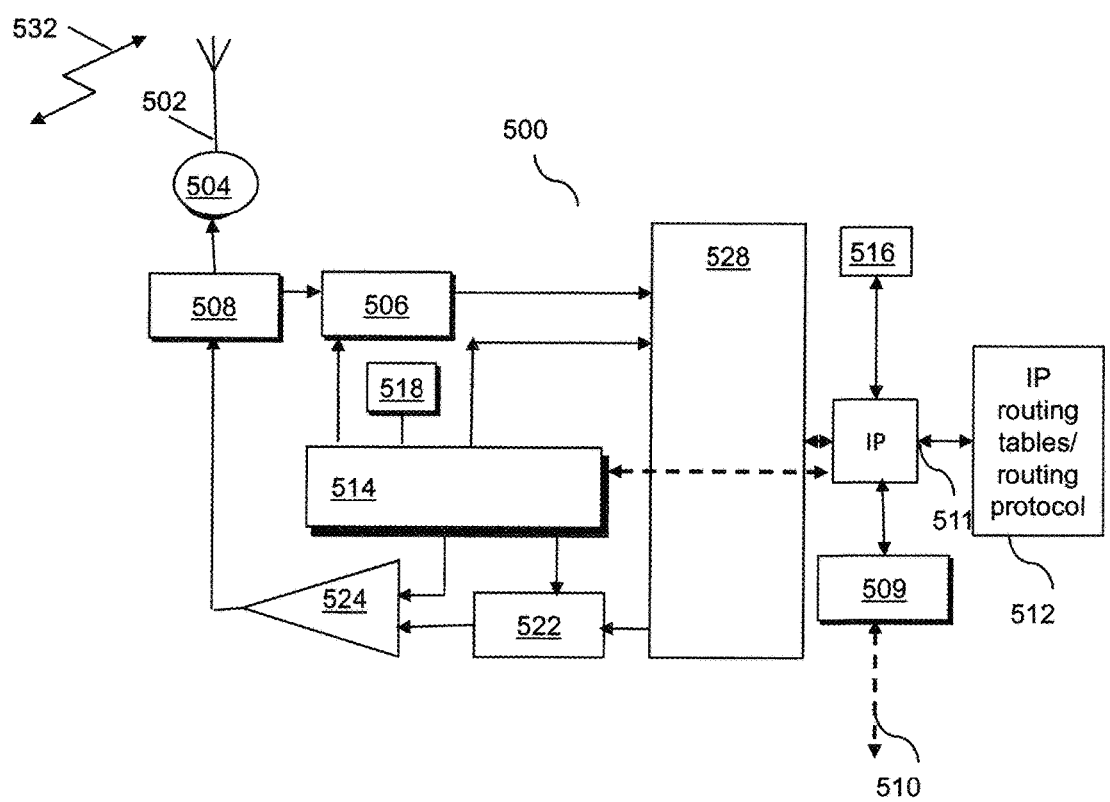
FIG. 5 illustrates an example of a modified router node, such as a router node in a network (such as a small network), in accordance with some example embodiments of the present invention.

Referring now to FIG. 5, an example of a router node 500, such as a router node in a network (such as a small or mesh network) modified by the functionality herein described, is illustrated in accordance with some example embodiments of the present invention. In example embodiments of the invention the router node 500 has been modified with the addition of consensus protocol that allows mDNS caches to be shared around the network. In practice, purely for the purposes of explaining embodiments of the invention, the router node 500 is described in terms of both a wireless communication device and a wireline connected device, such as a computer, network server, laptop, etc. In a wireless sense, the router node 500 contains one or more antenna(e) 502 for communicating via various wireless technologies. In one example, the one or more antenna(e) 502 (coupled via a wireless interface 508 with associated transmit and receive circuitry) is configured to radiate and receive radiated signals 532 on WiFi™ frequencies or bluetooth BT™ frequencies or cellular frequencies, e.g. LTE™ over a cellular network (not shown).

In a wireless example, the one or more antenna(e) 502 is coupled to an antenna switch or duplexer 504 that provides isolation between receive and transmit chains within the router node 500, as well as providing isolation between circuits targeted for the specific technologies being supported, e.g. LTE™, WiFi™, BT™. One or more receiver chains, as known in the art, include receiver front-end circuitry 506 (effectively providing reception, filtering and intermediate or base-band frequency conversion). The receiver front-end circuitry 506 is coupled to a signal processor 528 (generally realized by a digital signal processor (DSP)). A skilled artisan will appreciate that the level of integration of receiver circuits or components may be, in some instances, implementation-dependent. A controller 514 maintains overall operational control of the router node 500. The controller 514 is also coupled to the receiver front-end circuitry 506 and the signal processor 528. A timer 518 is operably coupled to the controller 514 to control the timing of operations (e.g. transmission or reception of time-dependent signals) within the router node 500.

In this example, controller 514 is connected to an internet protocol (IP) circuit/function 511, which is coupled to a cache 516 and one or more IP routing tables and/or routing protocol software 512. In a wireline sense, the controller 514 may be operably coupled to other devices and nodes via a wireline interface 509 using a wireline connection 510, such as Ethernet. In some examples, the signal processor 528 of the router node 500 may encompass much more functionality than the IP circuit/function 511 and IP routing tables and/or routing protocol software 512. In particular, in some examples, it is assumed that signal processor 528 may handle some or all of the higher layer functionality, such as HNCP.

There are a number of different approaches that are envisaged that can be employed for service storage in the router node 500. Thus, in some examples, the controller 514 is coupled to a cache 516 that selectively stores resource records of other nodes and devices, both internal and external to the mesh network. In examples of the invention, cache 516 is configured to store services that are accessible from other mesh edge nodes or internal routers in the network, e.g. mesh edge node 420 or internal routers 422, 424 in FIG. 4. In this manner, a store of the mDNS records is recorded in the cache 516 at the router node 500, which can be read and updated. In some examples, a new DNCP profile may be used to carry mDNS records (i.e. contents of mDNS cache) between router nodes, such as router node 500. In this manner, sharing of mDNS records around router nodes is supported. In some examples, such sharing may be performed using a HNCP, which is one (consensus-based) protocol that allows this feature (i.e. sharing information around a group of devices. In some examples, the HNCP protocol may include a new TLV or where a whole new profile is added to DNCP that is used as the base protocol. In some examples, records are obtained from the HNCP/new DNCP protocol, which may be added to the resource records stored in the cache 516.

In some examples, the cache 516 may also store operating regimes, such as decoding/encoding functions, synchronization patterns, code sequences, and the like to assist wireless communications. As regards the transmit chain, this essentially includes the signal processor 528 being coupled through one or more transmitter/modulation circuits 522 and one or more power amplifiers 524 to the one or more antenna(e) 502, which may be in a form of an antenna array, or a plurality of antennas. The transmitter/modulation circuits 522 and the power amplifiers 524 are operationally responsive to the controller 514.

In accordance with example embodiments, router node 500 and in particular signal processor 528 of router node 500 has been configured to provide Announcements to other router nodes and devices and respond to queries from the mDNS cache 516. In some examples, this may use classifications of DNS records, i.e. native records, where router node 500 may be allowed to respond itself and imported records where the updated mDNS function must respond itself.

In addition, router node 500 and in particular signal processor 528 of router node 500 has been configured to support a wireless and/or a wireline connection such as Ethernet. In some examples, signal processor 528 may perform all of the functions required of the router node 500, or in other examples the signal processor 528 may encompass multiple signal processors, for example dedicated to the various technologies being supported. In this regard, signal processor 528 supporting wireless may be implemented as distinct from a signal processor supporting Ethernet™ communication. Alternatively, a single processor may be used to support each technology. Clearly, the various components within the router node 500 can be realized in discrete or integrated component form, with an ultimate structure therefore being an application-specific or design selection.

Figure 6:
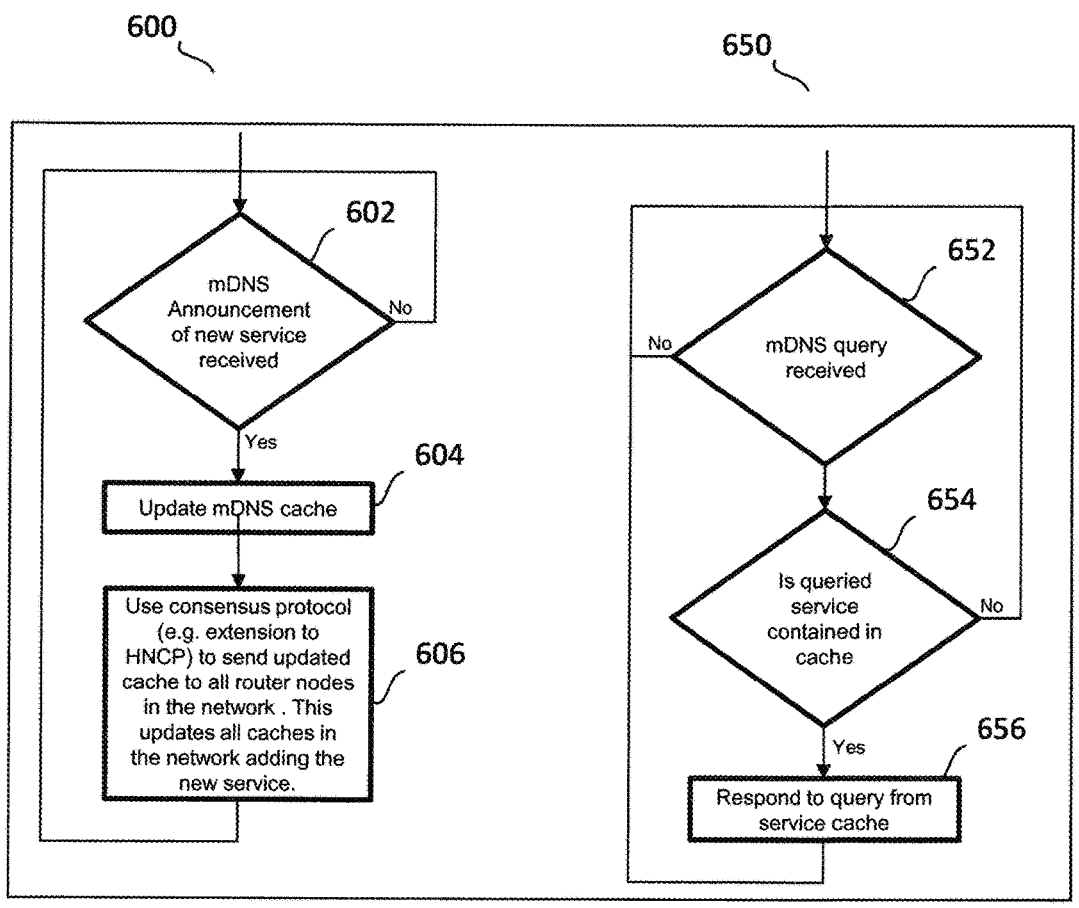
FIG. 6 illustrates an example flowchart for the operation of a router node when an announcement is received, in accordance with some example embodiments of the present invention.

Referring now to FIG. 6, a first example flowchart 600 of an operation of a router node with the addition of consensus protocol that allows mDNS caches to be shared around the network, such as router node 500 of FIG. 5, is illustrated in accordance with some example embodiments of the present invention. The first example flowchart 600 describes a router node operation when an 'Announcement' is received. Here, at 602, a determination is made as to whether an mDNS Announcement of a new service is received. If no mDNS Announcement of a new service is received, the flowchart loops back to 602. If an mDNS Announcement of a new service is received, the mDNS cache is updated, at 604. At 606, the consensus protocol (e.g. extension to HNCP) is used to send updated cache to all router nodes in the network. This updates all caches in the network adding the new service.

A second example flowchart 650 for the operation of a router node, such as router node 500 of FIG. 5, when a query is received is also illustrated, in accordance with some example embodiments of the present invention. At 652, a determination is made as to whether a mDNS query is received. If no mDNS query is received, the flowchart loops back to 652. If an mDNS query is received, a determination is made, for example by signal processor 528 of FIG. 5, as to whether the queried service is contained in a cache, at 654. If the queried service is not contained in a cache, at 654, the flowchart loops back to 652. If the queried service is contained in a cache, at 654, a response to the query is sent from a service cache at 656.

Figure 7:
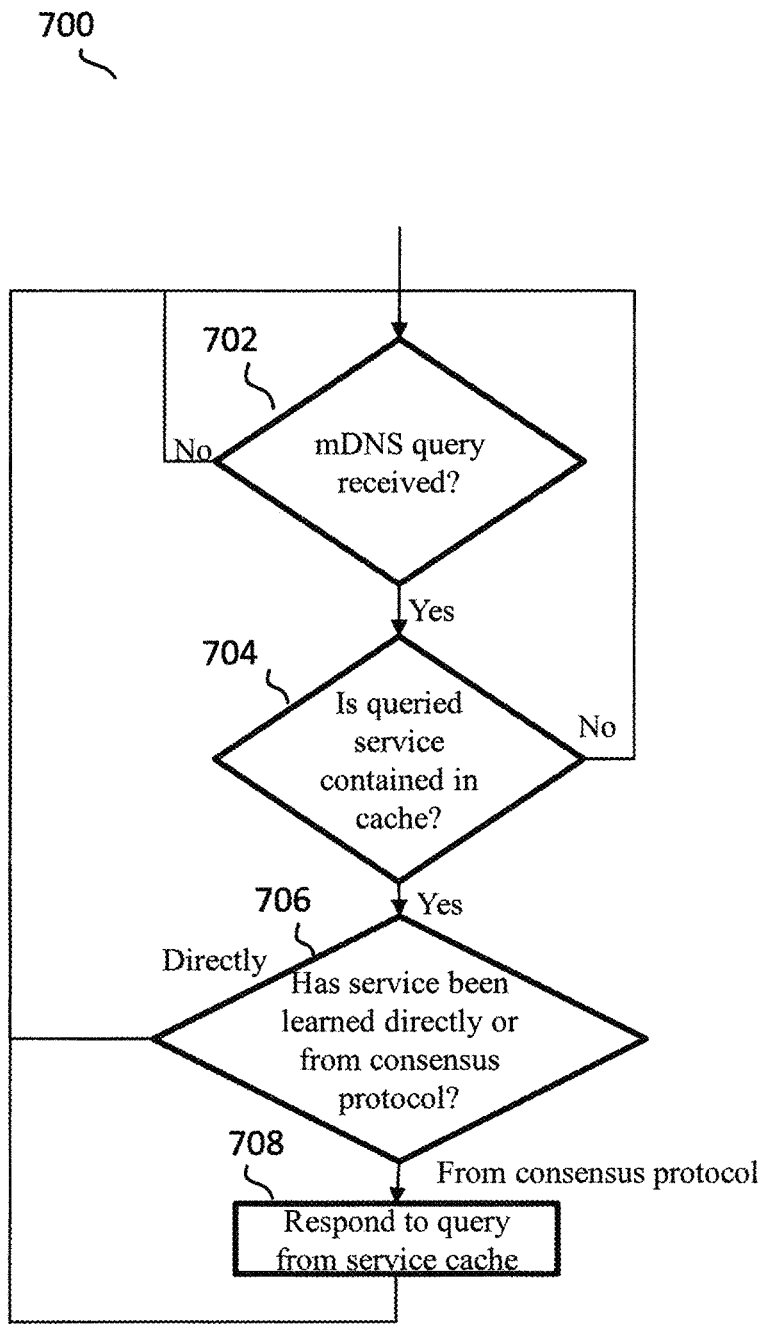
FIG. 7 illustrates an example flowchart of illustrates an example flowchart for the operation of a router node when a query is received in accordance with some example embodiments of the present invention.

Referring now to FIG. 7, a third example flowchart 700 of an operation of a router node with the addition of consensus protocol that allows mDNS caches to be shared around the network, such as router node 500 of FIG. 5, is illustrated in accordance with some example embodiments of the present invention, when a query is received, is illustrated in accordance with some example embodiments of the present invention. The third example flowchart 700 describes a router node operation when a query is received at the router node. At 702, a determination is made as to whether a mDNS query is received. If no mDNS query is received, the flowchart loops back to 702. If an mDNS query is received, a determination is made as to whether the queried service is contained in a cache, at 704. If the queried service is not contained in a cache, at 704, the flowchart loops back to 702. If the queried service is contained in a cache, at 704, a determination is made as to whether the service been learned directly or from consensus protocol, at 706. If the service has been learned directly at 706, the flowchart loops back to 702.

If the service has been learned from a consensus protocol, at 706, a response to the query is sent from a service cache at 708.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units.

Furthermore, it is intended that boundaries between logic blocks are merely illustrative and that alternative embodiments may merge logic blocks or circuit elements or impose an alternate composition of functionality upon various logic blocks or circuit elements. It is further intended that the small wireless mesh networks depicted herein are merely exemplary, and that in fact many other small wireless mesh network or architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A router node for a network, wherein the router node comprises:
   a transceiver configured to receive a multicast Domain Name System, mDNS, query;
   an interface operably coupled to the transceiver; and
   a signal processor operably coupled to the transceiver and a cache and configured to:
   receive resource records,
   learn resource record information from a consensus protocol supported by the signal processor,
   store the received resource records in the cache;
   and distribute resource records using mDNS to other nodes in the network via the interface,
   and wherein the signal processor determines whether mDNS records for a queried service are contained in the cache and have been learned from the consensus protocol, and in response to the queried service being contained in the cache and learned from the consensus protocol the signal processor sends a response to the mDNS query.

2. The router node of claim 1, wherein the signal processor is configured to support a use of DNS service discovery, DNS-SD, to determine an internet protocol, IP, address of devices and other router nodes located in the network.

3. The router node of claim 1 wherein the resource records include a Type-Length-Value, TLV, describing mDNS, cache information of other nodes in the network.

4. The router node of claim 1 wherein the consensus protocol is a Distributed Node Consensus Protocol, DNCP.

5. The router node of claim 4, wherein a Home Network Control Protocol, HNCP profile is used as an extension to the DNCP.

6. The router node of claim 1 wherein the signal processor and transceiver are configured to publish a resource record whenever the cache is updated.

7. The router node of claim 6 wherein the cache is updated following a receipt of an Announcement message of a new service within the network.

8. The router node of claim 1 wherein the signal processor is configured to share the router node's mDNS cache information using the consensus protocol with at least one other router node in a small network of one from a group of: a mesh network, a home network.

9. A method to allow service discovery in a network that comprises a router node coupled to a cache, the method comprising, at the router node:
   receiving a resource record identifying one or more other nodes or devices contained in or coupled to the network;
   learning resource record information from a supported consensus protocol;
   storing the received resource record in the cache;
   distributing resource records using multicast Domain Name System, mDNS, from the cache to other nodes and devices within the network;
   receive a mDNS query;
   determining whether mDNS records for a queried service are contained in the cache and have been learned from the consensus protocol, and sending a response to the query in response to the queried service being contained in the cache and learned from the consensus protocol.

10. The method of claim 9 further comprising supporting a use of DNS service discovery, DNS-SD, to determine an internet protocol, IP, address of devices and other router nodes located in the network.

11. The method of claim 9 further comprising: including a Type-Length-Value, TLV, that describes mDNS, cache information of other nodes in the network in the resource records.

12. The method of claim 9 further comprising publishing a resource record whenever the cache is updated.

13. The method of claim 12 further comprising updating the cache following a receipt of an Announcement message of a new service within the network.

14. A network comprising:
- a cache;
- at least one router node coupled to the cache and comprising:
  - a transceiver configured to receive a multicast Domain Name System, mDNS, query;
  - an interface operably coupled to the transceiver; and
  - a signal processor operably coupled to the transceiver and the cache and configured to support a consensus protocol;
- wherein the signal processor is configured to receive and distribute resource records using mDNS to other nodes in the network via the interface and store the resource records in the cache,
- and wherein the signal processor determines whether mDNS records for a queried service are contained in the cache and have been learned from the consensus protocol, and in response to the queried service being contained in the cache and learned from the consensus protocol the signal processor sends a response to the mDNS query.

15. A router node for a network, wherein the router node comprises:
- a transceiver;
- an interface operably coupled to the transceiver; and
- a signal processor operably coupled to the transceiver and a cache and configured to support a Distributed Node Consensus Protocol, DNCP, wherein a Home Network Control Protocol, HNCP profile is used as an extension to the DNCP;
- wherein the signal processor is configured to receive and distribute resource records to other nodes in the network via the interface and store the resource records in the cache.

16. A method to allow service discovery in a network that comprises a router node coupled to a cache, the method comprising, at the router node:
- supporting a Distributed Node Consensus Protocol, DNCP, wherein a Home Network Control Protocol, HNCP profile is used as an extension to the DNCP;
- receiving a resource record identifying one or more other nodes or devices contained in or coupled to the network;
- storing the received resource record in the cache; and
- distributing resource records from the cache to other nodes and devices within the network.

17. A network comprising:
- a cache;
- at least one router node coupled to the cache and comprising:
  - a transceiver;
  - an interface operably coupled to the transceiver; and
  - a signal processor operably coupled to the transceiver and the cache and configured to support a Distributed Node Consensus Protocol, DNCP, wherein a Home Network Control Protocol, HNCP profile is used as an extension to the DNCP;
- wherein the signal processor is configured to receive and distribute resource records to other nodes in the network via the interface and store the resource records in the cache.

* * * * *